US011636542B2

(12) United States Patent
Pechenik et al.

(10) Patent No.: US 11,636,542 B2
(45) Date of Patent: Apr. 25, 2023

(54) METHOD AND SYSTEM FOR COLLECTING AND USING MARKET DATA FROM VARIOUS SOURCES

(75) Inventors: Jacob E. Pechenik, New York, NY (US); Gregory S. Campbell, Brooklyn, NY (US); Douglas E. Miller, Brooklyn, NY (US); Blake A. Barnes, New York, NY (US)

(73) Assignee: ICE Data, LP, Atlanta, GA (US)

( * ) Notice: Subject to any disclaimer, the term of this patent is extended or adjusted under 35 U.S.C. 154(b) by 685 days.

(21) Appl. No.: 12/942,081

(22) Filed: Nov. 9, 2010

(65) Prior Publication Data

US 2011/0276516 A1 Nov. 10, 2011

Related U.S. Application Data

(62) Division of application No. 11/961,296, filed on Dec. 20, 2007.

(60) Provisional application No. 60/876,212, filed on Dec. 21, 2006.

(51) Int. Cl.
*G06Q 40/04* (2012.01)
*G06Q 40/06* (2012.01)
*G06Q 30/0201* (2023.01)
*G06Q 10/10* (2023.01)
*G06Q 30/00* (2023.01)

(52) U.S. Cl.
CPC ............. *G06Q 40/04* (2013.01); *G06Q 10/10* (2013.01); *G06Q 30/00* (2013.01); *G06Q 30/0201* (2013.01); *G06Q 30/0206* (2013.01); *G06Q 40/06* (2013.01)

(58) Field of Classification Search
CPC .................................. G06Q 40/04; G06F 5/00
See application file for complete search history.

(56) References Cited

U.S. PATENT DOCUMENTS

| 5,195,031 | A | 3/1993 | Ordish |
| 7,162,447 | B1 | 1/2007 | Cushing |
| 7,542,938 | B1* | 6/2009 | Tam ........................ G06Q 40/04 705/37 |
| 2001/0044771 | A1 | 11/2001 | Usher et al. |
| 2001/0049651 | A1* | 12/2001 | Selleck .................. G06Q 30/06 705/37 |
| 2002/0023045 | A1 | 2/2002 | Feilbogen et al. |
| 2002/0112171 | A1 | 8/2002 | Ginter et al. |

(Continued)

FOREIGN PATENT DOCUMENTS

| GB | 2 419 694 A | 5/2006 |
| WO | 03/012588 A2 | 2/2003 |

OTHER PUBLICATIONS

The Office Action dated May 1, 2014 for corresponding Canadian Application No. 2,645,004.

(Continued)

*Primary Examiner* — Jay Huang
(74) *Attorney, Agent, or Firm* — DLA Piper LLP (US)

(57) ABSTRACT

A system and a method for collecting and using market data. The system includes a workstation, where at least one message is entered, a transmitter, where the at least one message is transmitted, a parser for parsing the at least one message, a data recognizer for identifying relevant information in the at least one message, a processor for extracting the relevant information and a communicator for communicating the relevant information.

7 Claims, 20 Drawing Sheets

(56) References Cited

U.S. PATENT DOCUMENTS

| | | | |
|---|---|---|---|
| 2002/0133453 A1 | 9/2002 | Rose | |
| 2002/0161693 A1 | 10/2002 | Greenwald | |
| 2002/0184237 A1 | 12/2002 | McFeely | |
| 2003/0028468 A1* | 2/2003 | Wong | G06Q 40/04 705/37 |
| 2003/0061149 A1 | 3/2003 | Ajitsaria et al. | |
| 2003/0097325 A1 | 5/2003 | Friesen et al. | |
| 2004/0193442 A1 | 9/2004 | Kimata et al. | |
| 2005/0049955 A1 | 3/2005 | Kohnhorst et al. | |
| 2005/0066002 A1* | 3/2005 | Teres | G16H 80/00 709/204 |
| 2005/0182756 A1 | 8/2005 | Eppley et al. | |
| 2006/0015432 A1 | 1/2006 | Minaguchi et al. | |
| 2006/0026091 A1* | 2/2006 | Keen, Jr. | G06Q 40/025 705/37 |
| 2006/0080214 A1 | 4/2006 | Hausman | |
| 2006/0156222 A1* | 7/2006 | Chi | G06F 40/247 715/231 |
| 2006/0229955 A1 | 10/2006 | Ono et al. | |
| 2007/0022037 A1 | 1/2007 | Pechenik et al. | |
| 2007/0050280 A1 | 3/2007 | Madle et al. | |
| 2007/0118455 A1 | 5/2007 | Albert et al. | |
| 2007/0219901 A1 | 9/2007 | Garbow et al. | |
| 2007/0288658 A1* | 12/2007 | Lam | G06Q 10/109 709/246 |
| 2008/0162173 A1 | 7/2008 | Pechenik et al. | |
| 2008/0215477 A1 | 9/2008 | Annunziata | |
| 2010/0082755 A1 | 4/2010 | Bryan et al. | |
| 2011/0238557 A1 | 9/2011 | Barry | |

OTHER PUBLICATIONS

Canadian Office Action dated Sep. 21, 2015 for corresponding Canadian Application No. 2,843,458.

"Reuters Order Routing for Commodities, The Order Routing Hub Giving You the Advantage in the European Energy Markets," Reuters, https://www.theice.com/publicdocs/data/Order_routing_for_commodities.pdf, 2005.

* cited by examiner

FIG. 5

88b. Quote Console – YJ Energy

10:26:35 AIM Contact: hello
10:28:54 AIM Contact h 1200 puts crossing 10.50 20@.25

[ PT (t) ]  [ KILL (k) ]  [ MATCH (m) ]  [ DELETE ]  [ UNLOCK ]

| Update | Product | Bid Contact | Bid | Offer | Offer Contact | Last | P | My Bid | K | My Offer | K | MyPrice | Theoretic... | Imp |
|---|---|---|---|---|---|---|---|---|---|---|---|---|---|---|
| 10:43AM | h07 15.00 calls live | dmiller | >0.1300 | 0.1550 < | dmiller | | T | 0.1300 | K | 0.1550 | | | 0.2021 | 7 |
| | h07 15.00 calls live 0.1300@0.1550 | | | | gcamp | | | 0.1300 | K | 0.1550 | | Send | Save | Canc... |
| 10:26AM | h07 12.00 puts vs 10.50 | AIM Contact | 0.2000 | 0.2500 | AIM Contact | | T | | | | | | 3.8897 | |

[ 12 ]  [ @ 16 ]  [ gcamp ▼ ]  [ SAVE ]  [ FIND ]  [ CLEAR ]

h 15 calls

B<sub>B</sub> Quote Console - YJ Energy

11:01:47 jrogers: hello
11:02:06 jrogers: check out h/j 18 pspvd 12@16

| PT (t) | | KILL (k) | | MATCH (m) | | DELETE | | | UNLOCK | | |
|---|---|---|---|---|---|---|---|---|---|---|---|
| Update | Product | | Bid Contact | Bid | Offer | Offer Contact | Last | P | My Bid | K | My Offer | K | MyPrice | Theoretic... | Imp |
| 11:00AM | h07 18.00/h07 18.00 puts sprd live | jrogers | 0.1200 | 0.1600 | jrogers | | T | | | | | -0.3193 |
| | h07 18.00/h07 18.00 puts sprd live 0.1200@0.1600 | | | | all | | | 0.1200 | K | 0.1600 | Send | Save | Canc... |
| 10:43AM | h07 15.00 calls live | dmiller | >0.1200 | 0.1550k | dmiller | | T | 0.1300 | K | 0.1550 | | 0.2022 | |
| 10:26AM | h07 12.00 puts vs 10.50 | AIM Contact | 0.2000 | 0.2500 | AIM Contact | | T | | | | | 3.8897 | |

| BID | | @ | OFFER | | dmiller ▼ | | SAVE | | | FIND | | CLEAR |

○ jrogers: check out h/j 18 pspvd 12@16

| | PT (t) | | KILL (k) | | MATCH (m) | | DELETE | | | | | | UNLOCK | | |
|---|---|---|---|---|---|---|---|---|---|---|---|---|---|---|---|
| Update | Product | | | Bid Contact | | Bid | Offer | Offer Contact | Last | P | My Bid | K | My Offer | MyPrice | Theoretic... | Implied... | De |
| 11:48AM | x07-h08 1.00 calls live trades at 8.7181 | | | buyer:undefined | | seller:undefined | | notify:nobody | 8.7181 | T | | 100 | copy-B | copy-S | Port Cancel | 8.7181 | 10.21 | 0.0 |
| | B/S | Product | | Size | Premiu... | Implied... | Delta | Gamma | Vega | Theta | | | | | | |
| | B | LN X7 1c | | 100 | 7.5516 | 0.0891 | 0.0035 | 0.0000 | 0.0000 | 0.0010 | | | | | | |
| | B | LN Z7 1c | | 100 | 8.2504 | 0.0968 | 0.0035 | 0.0000 | 0.0000 | 0.0011 | | | | | | |
| | B | LN F8 1c | | 100 | 8.9824 | 0.1048 | 0.0035 | 0.0000 | 0.0000 | 0.0012 | | | | | | |
| | B | LN G8 1c | | 100 | 9.4153 | 0.1038 | 0.0094 | 0.0000 | 0.0000 | 0.0012 | | | | | | |
| | B | LN H8 1c | | 100 | 9.3845 | 0.1099 | 0.0094 | 0.0000 | 0.0000 | 0.0012 | | | | | | |

| 20 | @ | 30 | Identifier ▼ | SAVE | FIND | CLEAR | x7h 100 calls

Quote Console - YJ Energy

| | H | I | J | K | L | M | N |
|---|---|---|---|---|---|---|---|
| 1 | | | | | | | |
| 2 | ID | PRODUCT | TERM | RATIO | OPTION/SWAP | CALL/PUT | STRIKE |
| 3 | Market-3456012 | LN | X7 | | 1 OPTION | c | 1 |
| 4 | Market-3456012 | LN | Z7 | | 1 OPTION | c | 1 |
| 5 | Market-3456012 | LN | F8 | | 1 OPTION | c | 1 |
| 6 | Market-3456012 | LN | G8 | | 1 OPTION | c | 1 |
| 7 | Market-3456012 | LN | H8 | | 1 OPTION | c | 1 |
| 8 | | | | | | | |

METHOD AND SYSTEM FOR COLLECTING AND USING MARKET DATA FROM VARIOUS SOURCES

RELATED APPLICATION INFORMATION

This application is a divisional of U.S. application Ser. No. 11/961,296 filed Dec. 20, 2007, which claims priority to U.S. Provisional Application No. 60/876,212 filed Dec. 21, 2006, the entire contents of which are incorporated herein.

BACKGROUND OF THE INVENTION

The present invention generally relates to a system for trading and analyzing derivative products, and more particularly, software that aggregates, organizes, parses and extracts market data for trading information from Over-The-Counter (OTC) networks.

Derivatives can be traded either on an exchange or off-exchange. Derivatives traded on an exchange are called exchange-traded derivatives. The primary purpose of exchanges is to provide contract standardization, anonymity, a clearing system, price transparency and a large number of participants in order to provide liquidity in a contract.

Derivative contracts entered into through private negotiations are typically called off-exchange or OTC derivatives. OTC contracts allow the creation of products whose risk-return characteristics closely match the needs of individual customers. Additionally, the nature of private, non-transparent markets addresses privacy concerns when participants do not want the terms of their trade or prospective trade advertised to the broader market.

When dealing in OTC markets, brokers typically quote custom derivative contract descriptions (structures) to dealers via phone or instant messaging. This conventional method has many disadvantages. For example, when instant messaging a quote to a group of dealers (traders), not every dealer will receive the quote at the same time, which creates an unfair advantage to those dealers who receive the quote first. Also, when a quote is sent to a dealer, the dealer does not immediately know if the quote is new or if it is an update of a previous quote. Further, brokers often send quotes out in varying formats, so that the dealer must then reformat the quote information into a format that can be incorporated into the dealer's analysis system. In this regard, dealers must be able to quickly analyze a large amount of data. Thus having to compose quote data into spreadsheets or otherwise reformat the data before any analysis begins is a clear disadvantage.

In OTC markets, traders are faced with the burdensome task of gathering, deciphering and consolidating all information on quoted structures. In this regard, traders deal with quotes coming from multiple brokers in differing formats. Also, traders conventionally have no dynamic aggregated view of the market across brokers that updates in real-time as quotes are updated. If the trader is away from his desk or otherwise busy, it is difficult to catch up on market events.

In general, participants of OTC markets share "indicative" prices with each other. Quotes are generally not "firm"—the recipient of the quote is not guaranteed a transaction if they attempt to execute on the bid or the offer. Instead, these prices are said to be "indications of interest" or IOIs. The participant looking to execute on the bid or the offer must first check with the owner of the quote to ensure that the quote is still accurate. It is generally understood by participants that quotes are most accurate when they are first distributed; once quotes begin to "age" there is a greater chance that market conditions have changed and the quote in question is no longer accurate.

Another disadvantage of OTC markets is that dealers have a difficult time performing mark-to-market portfolio valuation which is required to monitor profit and loss and risk exposure because of the OTC market's lack of a centralized source for current and historical prices. Further, corporate scandals demand OTC market participants have an independently auditable accounting system that marginalizes instances of non-representative pricing and data manipulation.

In general, OTC markets offer difficulties to all parties involved in such markets. For example, dealers do not have access to data for obtaining current prices of structures or for back-testing trading models. Profit and loss and risk management personnel do not have access to data for price verification or to update the value of a portfolio. Further, in OTC markets, it is difficult to maintain records for compliance or for settlement of disputes.

The OTC market accounts for approximately eighty percent of all financial derivatives trading, deriving its strength from an ability to facilitate private transactions in highly customizable structures. However, its broad coverage, versatility, and lack of standards leads to significant inefficiencies. Information exchange and negotiation is labor-intensive, typically requiring the facilitation of a broker. Non-uniform contract descriptions are often communicated by a combination of a non-secure, public consumer-oriented instant messaging product, telephone and email. Information management is currently error-prone and consumes resources which could be devoted to analysis and execution. These inefficiencies result in high reconciliation costs, lost opportunities and reduced profits.

There is a need for standardizing the trading process and automating distribution such that the display of the OTC market data is in a secure and compliant environment. Further, there is need for automating post-trade functions, such as entering trades into clearing and other systems.

SUMMARY OF THE INVENTION

One embodiment of the present invention is a system for collecting and using market data. The system includes a workstation, where at least one message is entered, a transmitter, where the at least one message is transmitted, a parser for parsing the at least one message, a data recognizer for identifying relevant information in the at least one message, a processor for extracting the relevant information and a communicator for communicating the relevant information.

Another embodiment of the present invention is a method for collecting and using market data. The method includes inputting a message at a workstation, transmitting the message, parsing the message, identifying relevant information in the message, extracting the relevant information in the message and communicating the relevant information in the message.

BRIEF DESCRIPTION OF THE DRAWINGS

Various exemplary embodiments of the present invention will be described in detail, with reference to the following figures, wherein:

FIG. 5 is a screen shot of the structured data shown parsed in FIG. 3B being entered into a quote console according to an embodiment;

FIG. 6 is a screen shot of the quote console of FIG. 5 being used to enter bid and offer information according to an embodiment;

FIG. 7 is a screen shot of a structure's best bid and offer in the quote console of FIG. 5 being matched according to an embodiment;

FIG. 8 is a screen shot showing an example of killing the user's bid or offer in the quote console of FIG. 5 according to an embodiment;

FIG. 9 is a screen shot showing an example of generating a trade entry in the quote console of FIG. 5 according to an embodiment;

FIG. 13 illustrates the interaction of the quote console of FIG. 5 with a pricing service according to an exemplary embodiment;

FIG. 14 illustrates the structure and quote data sent to a spreadsheet program according to an exemplary embodiment;

FIG. 16 illustrates a Quote Console, according to an exemplary embodiment with a "direct send" button highlighted;

FIG. 18 illustrates a Quote Console, according to an exemplary embodiment with a "kill" button highlighted;

FIG. 21 illustrates an inline alert in a Quote Console, according to an exemplary embodiment.

DETAILED DESCRIPTION OF THE EMBODIMENT OF THE PRESENT INVENTION

The various exemplary embodiments of the present invention are directed to a virtual over-the-counter exchange system which allows users, or systems on behalf of users, to input product data to a virtual database where the data is standardized, distribution is automated and the organization and display of the OTC market data is in a secure and compliant environment.

The present invention provides technology that allows for efficient information exchange for decentralized markets without disrupting existing workflows or interfering with existing relationships.

Figure 1:
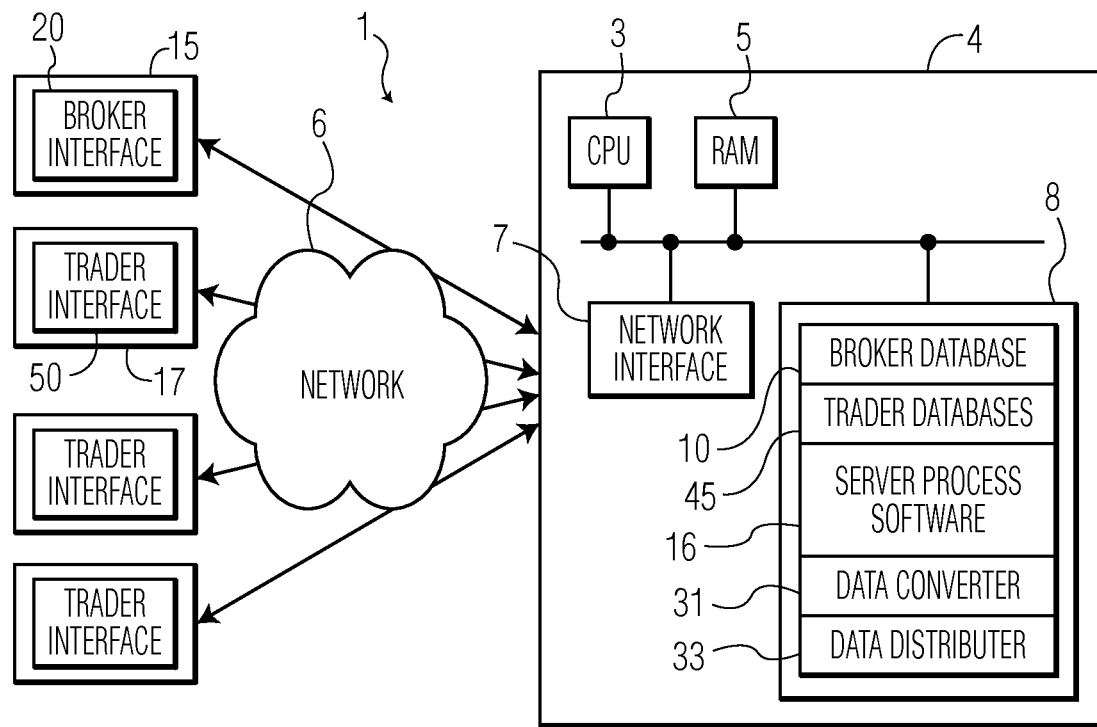
FIG. 1 shows a computer based system for establishing a virtual over-the-counter exchange according to an exemplary embodiment of the present invention.
Figure 2:
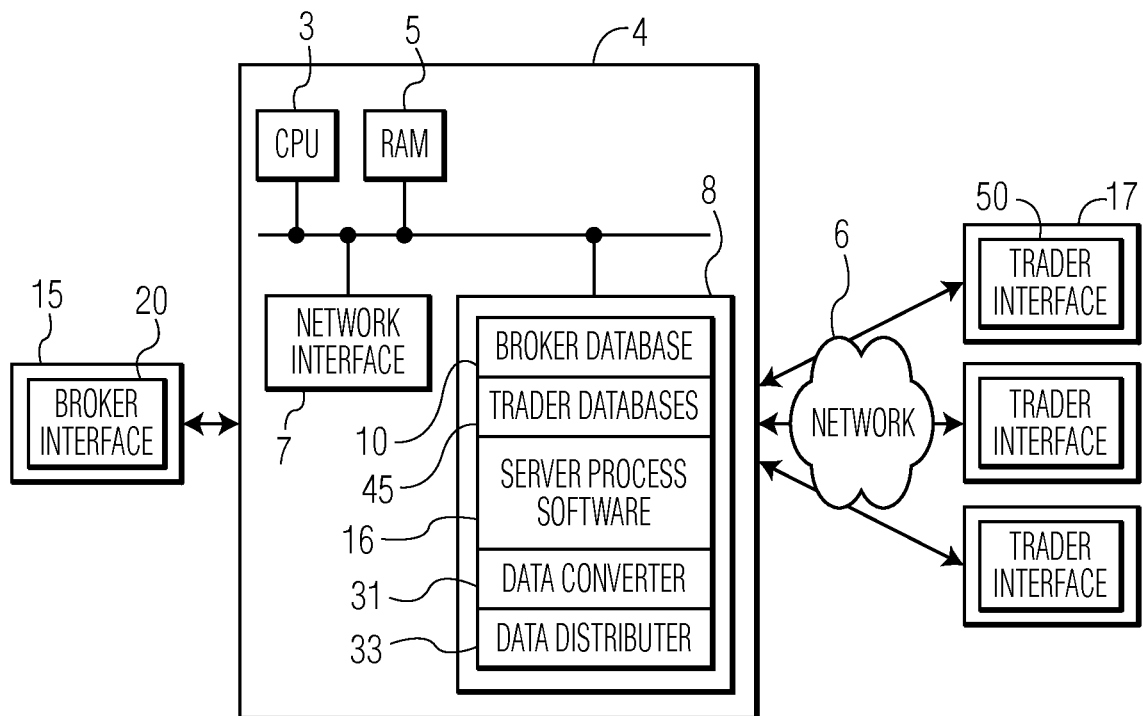
FIG. 2 shows a computer based system for establishing a virtual over-the-counter exchange according to another exemplary embodiment of the present invention.

FIG. 1 shows a computer based system 1 for establishing a virtual OTC exchange according to an exemplary embodiment of the invention. The system 1 in this embodiment includes a user computer 15 and a plurality of other user computers 17 used to communicate with user computer 15 are connected to a server computer 4 over a wide area network 6, such, for example, the Internet. It should be appreciated that in other embodiments of the present invention, the computer based system 1 may include any number of user computers. In an exemplary embodiment of the present invention, when a user at computer 15 or 17 (as shown in FIG. 2) logs into server computer 4 using login information, server computer 4 is able to determine whether to send information based on the login information. Server computer 4 includes a central processing unit (CPU) 3, a primary memory (i.e., RAM) 5, a network interface 7, and a secondary memory (not shown). Secondary memory is preferably disk storage. Code is stored in secondary memory for performing a plurality of processes, executable by the CPU 3, which function together to establish a virtual exchange for OTC traded derivatives, such as, for example, weather or natural gas derivatives. Alternatively, each of the processes may run on a separate hardware element of server computer 4. Alternatively, each of the processes may also be load balanced across multiple server computers for scalability and fault tolerance. As will be explained in further detail below, computers 15 and 17 may be located at, but are not limited to, brokerage houses or trader workstations, where broker and/or trader whiteboards are displayed for easy viewing and manipulation of financial product data.

As shown in FIG. 2, in an alternative embodiment of the invention, a plurality of user computers 17 are connected via a wide area network (WAN). The server computer 4 is local to another user computer 15, and information may be exchanged between user computers 15 and 17 over a wide area network 6, such as, for example, the Internet. Alternatively, server computer 4 may be local to user computer 17, and user computer 15 may communicate with server computer 4 over the Internet. In either embodiment, server computer 4 may provide an instant messaging gateway, which allows users of computers 15 and 17 to communicate with one another via instant messaging, such as, for example, AOL Instant Messenger, Yahoo! Messenger and Jabber. In either embodiment, server computer 4 may represent a cluster of server computers with processes distributed among the hardware elements.

Stored in the secondary memory 8 are one or more of a plurality of virtual user databases 10 and server process software 16. In one embodiment, each user has its own virtual database. Each virtual database may contain data published to it from any other user, both on and off the system, both directly from a source virtual database, and from other inputs and sources. The server process software 16 contains logic to receive requests, commit received data and distribute data to and from the databases and the user computers.

Each user database 10 may include "master" information relating to, for example, each trader/broker counterparty, each derivative structure listed, quotes on all structures, a history of bid and/or offer and trade updates for each structure, specific details on user relationships, and preferred format of quotes when sent in string format to a particular counterparty. A "structure" is an OTC contract description, for example, a call spread, straddle, strangle or any other type of OTC contract type. If the user is in a group, virtual database 10 may be shared by a group of users. Virtual database 10 may also be located at the user's site in certain configurations. In general, virtual database 10 preferably contains historical information. A user may use this information to determine where to send information regarding a structure and how the information is to be transferred. Information comes directly from the server and is published for its users.

Database 10 may contain data that may be analyzed and re-purposed to provide insight into preferences and behavior. This data may be used to automatically associate users with structures that they are likely to be interested in based on previous activity. Both database 10 and database 45 store financial structure and quote data information in a standard format, preferably one from which customized text-based quotes may easily be created. The data string representing each of the financial structures may be distributed as financial structure information updates and quotes via instant messaging or e-mail, for example.

The server process software 16 may include a data converter 31 and a data distributor 33. Data converter 31 contains logic to translate financial product information received from any interface 20 into a standard data protocol for storage in the virtual database 10. In this regard, the data converter is preferably an application program interface (API) which allows for communication between user computers 15 and server computer 4 by providing a number of server controllers. Thus, any suitable interface 20 may be used to interact with the server software as long as it is configured to the requirements of the API. The data distributor 33 distributes financial structure information stored in database 45 to a corresponding one of the plurality of interfaces 50 in one of a plurality of proprietary formats. For example, user interface 50 may be an e-mail system, in which case the data distributor 33 would translate the data stored in virtual database 45 into text for sending and using SMTP protocol. The previously mentioned API is preferably used for communication between any type of interface system and the server computer 4. The data distributor 33 also determines whether the user is available to receive financial structure information either through a proprietary graphical interface, or via any other type of communications means, such as instant messaging or e-mail, and determines the proper data protocol for distribution based on the user's availability. Interface 50 may include any suitable communication means, as long as such means is configured to the requirements of the previously mentioned API.

Graphical interface 20 retrieves data from and sends data to virtual database 10 and displays information regarding financial products at computer 15. Interface 20 allows users to create structures, manage quotes, disseminate quotes, analyze quotes and price structures, trade, and communicate with individuals or groups over secure, logged instant messaging. In one embodiment of the present invention, interface 20 may be a graphical interface.

Figure 3A:
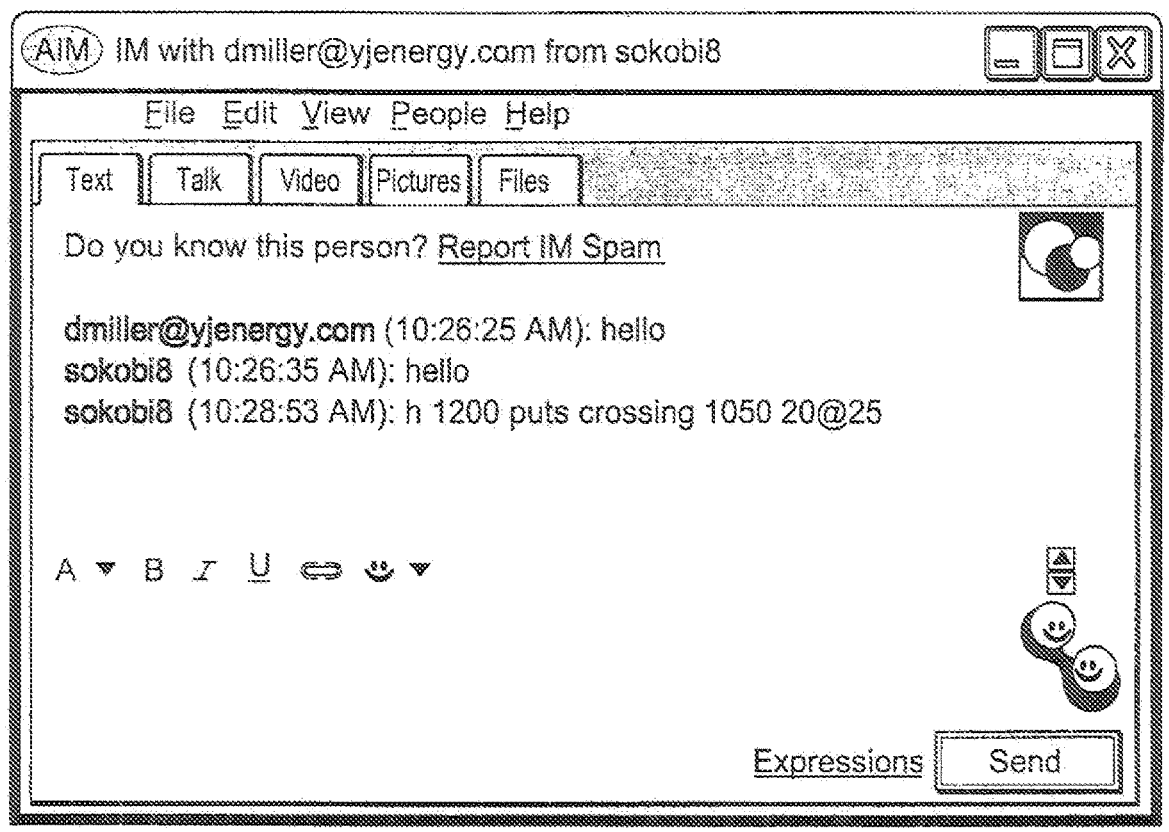
FIGS. 3A AND 3B are screen shots of unstructured text parsed into structured data and text according to an exemplary embodiment of the present invention.
Figure 3B:
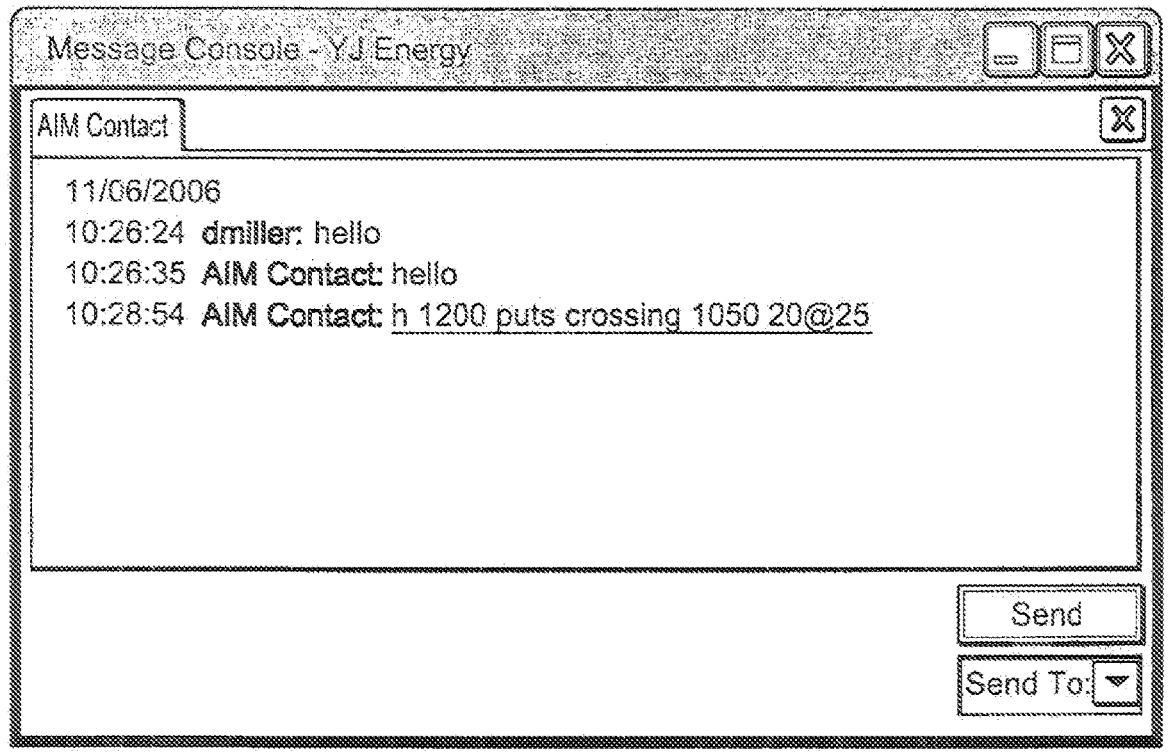

As shown in FIGS. 3A and 3B, the present invention provides quotes to its users. In this example, unstructured text is entered into an IM screen. The unstructured text is sent to a user in the form of a text message from a non-user. The unstructured text message is then parsed and a quote on a structure is recognized and highlighted, as can be seen in FIGS. 3A and 3B.

One method the present invention uses to recognize and highlight data is by its market data recognition (MDR) feature. The MDR can recognize structures and quotes on structures in chat messages received from a non-user, and structures and quotes on structures from a user's sent chat messages. In addition, structures and quotes on structures generated from a user's quote console can be recognized by the MDR. The MDR is also capable of recognizing incoming and outgoing quote messages between users and non-users. This feature converts unstructured text into usable quotes. Virtually any process may be used to convert the text into structures and quotes on structures.

The MDR also has the ability to recognize bids and offers. The MDR will associate a recognized bid and/or offer with a user's set of quotes on a structure based on the counter-party contact's updated history and/or activity. The collection of quotes for the structure may automatically be updated with any recognized incoming or outgoing bids and/or offers, according to a user's preferences. All structure data is normalized and correlated with existing structure data. Thus, multiple quotes associated with the same structure can be associated for display or other purposes. In addition, the MDR provides for an inline chat message capability to add a quote to a structure. A string of unstructured data is paired with contextual information, such as the identity and preferences of the sender and receiver, and is given to an identifying component. The identifying component may use the contextual information to configure its operation or set default behaviors and settings. For example, if the sender typically sends quotes for derivatives on a particular underlying asset, an identifier may use the default underlying asset while parsing the string from that sender if no underlying asset is indicated. If the component accepts the string, it pulls the structure and quote data out of the string and creates an identifying object. The identifying object consists of the matching substring and structure, and any quote and trade information associated with that structure by the string. The default implementation of the identifier component is a composite of implementations of the same interface, such that when the string is passed through an ordered chain of identifier components, each identifier either accepts or rejects the string. If an identifier accepts the string, then the processing stops. When the identifier accepts the string, it pulls the product data out of the string and creates an identifier object, which is returned by the encompassing identifier implementation. Each identifier is associated with an ordered list of expressions that conform to an interface identified by the identifier. Essentially, the identifiers extract a given set of information tagged by a given set of names. The string is passed through the list of expressions, in order, until one of the expressions matches. The identifier extracts the information and creates an identifier object. Expressions are defined using a multi-level expression template library which makes the creation of new patterns very easy. Also, there is a framework for identifying strings that should have been parsed. An identifier may also consist of a hierarchy of expressions such that parents can parse some parts of the string and delegate the parsing of other parts to child expressions.

Once the MDR has converted unstructured text to a structure and quote any number of processes may be performed on the resulting structure and quote. An example of one such real-time process is customizable and configurable alerts. Alerts can notify the user of any number of conditions that may or may not be present in the newly created structure and quote. For example, in an embodiment of the present invention, the user may configure an alert to notify himself/herself when a recognized bid is above the theoretical price generated by the Pricing Service Integration (PSI) component (described below) or when a recognized offer is below the theoretical price generated by the PSI. Other alerts could be created from this framework including, but not limited to, alerts to certain product types, certain structures, certain financial characteristics of structures, and certain movements in the bid/ask.

Figure 20:
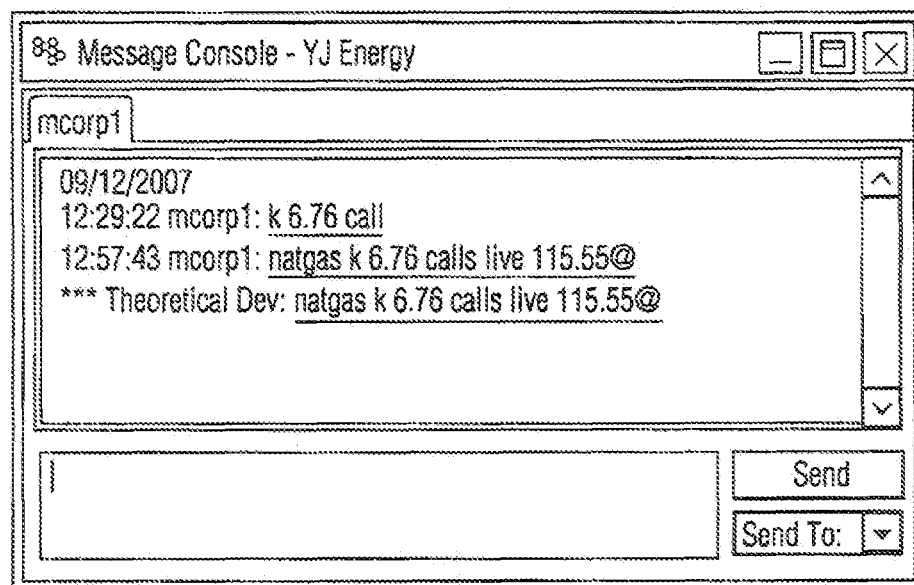
FIG. 20 illustrates an inline alert in the Message Console, according to an exemplary embodiment.
Figure 21:
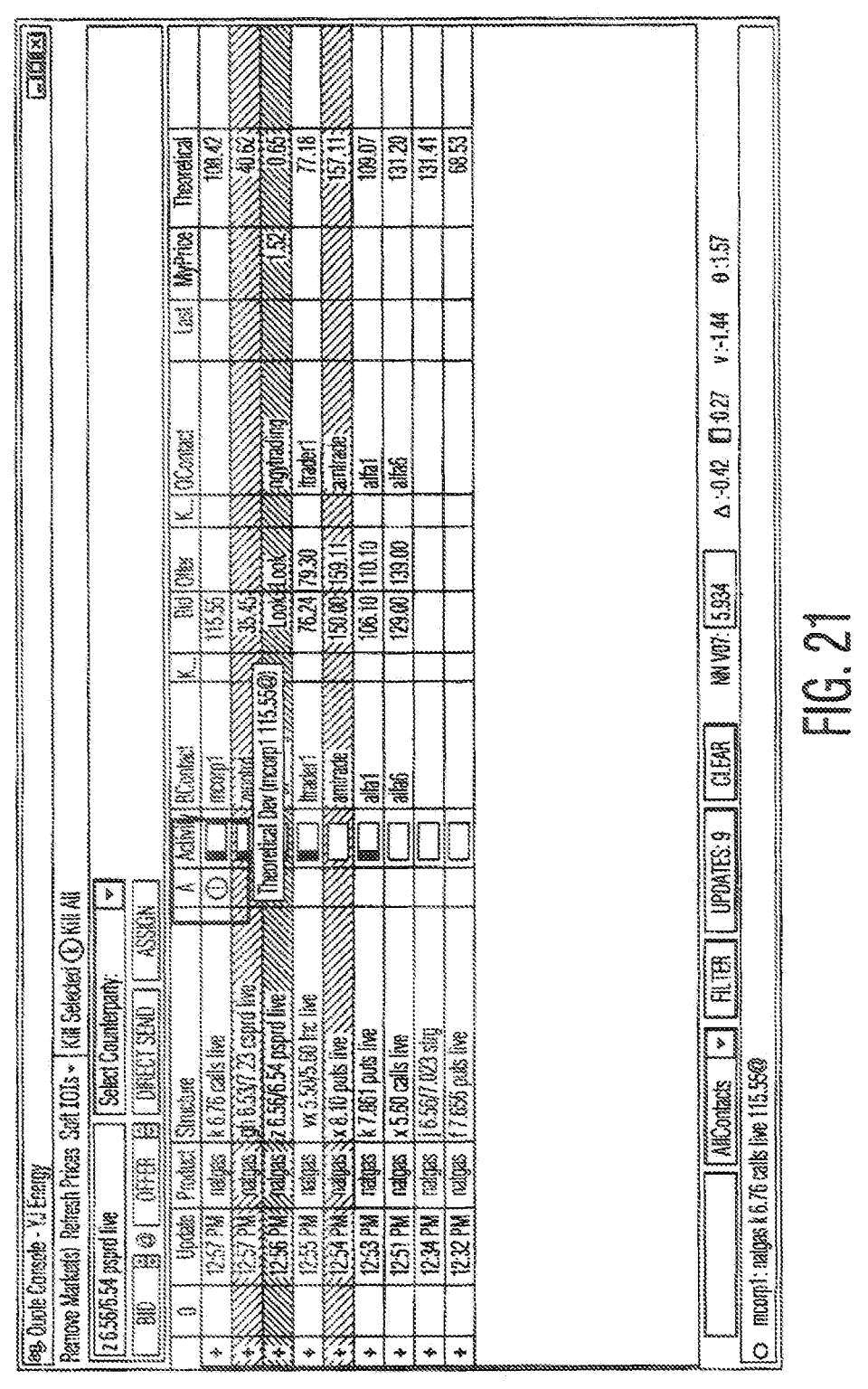

In an embodiment, these alerts are presented to the user in three forms: directly inline in the Message Console, in the Activity Log (discussed below) and through icons in Quote Console. The user can "click" an alert in the Message Console to open the Quote Console and jump directly to the structure in question. FIG. 20 shows an alert inline in the Message Console and FIG. 21 shows an alert icon in the Quote Console.

The MDR includes a set of identifying components, which comprise of a library of identifying components. Because the format of instant messages may vary from market participant to market participant, because additional commodity types with additional conventions for describing market data are introduced, and because conventions for existing commodity types may change over time, it is beneficial for the library to be maintained.

The system includes a process for maintaining this library of components. The system and process comprise of a method for flagging strings that contain market data but which cannot be accurately parsed, and a set of authoring tools that allow component authors to rapidly add and modify library components. In the default implementation of each, composite identifiers may be augmented to compose additional subcomponents, and subcomponents may be authored that conform to pre-existing interfaces. If new types of data need to be extracted, new types of interfaces may be created. In the default implementation, users are able to easily flag a string that contains quote information but which was not parsed using the quote console.

Figure 4A:
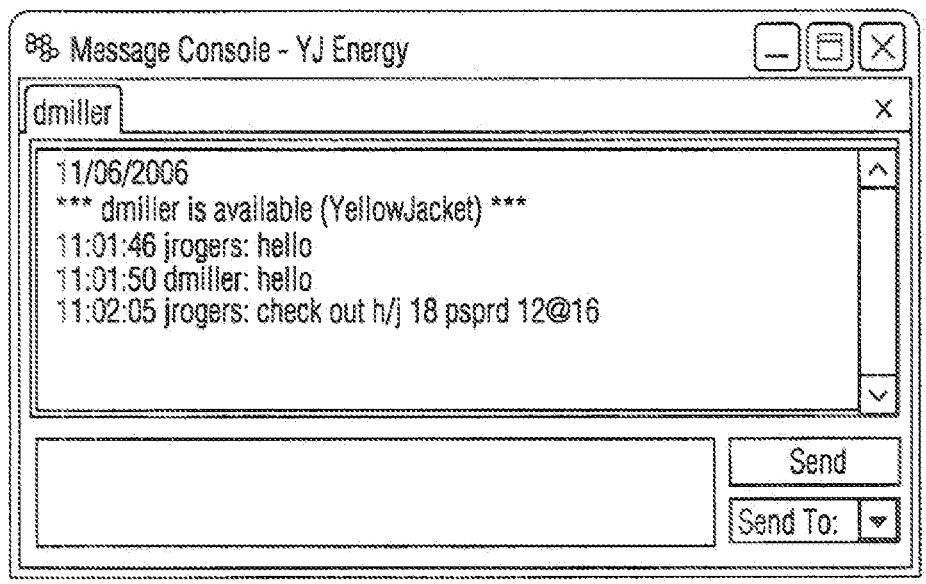
FIGS. 4A and 4B show another feature of unstructured text parsed into structured data and text according to an exemplary embodiment.
Figure 4B:
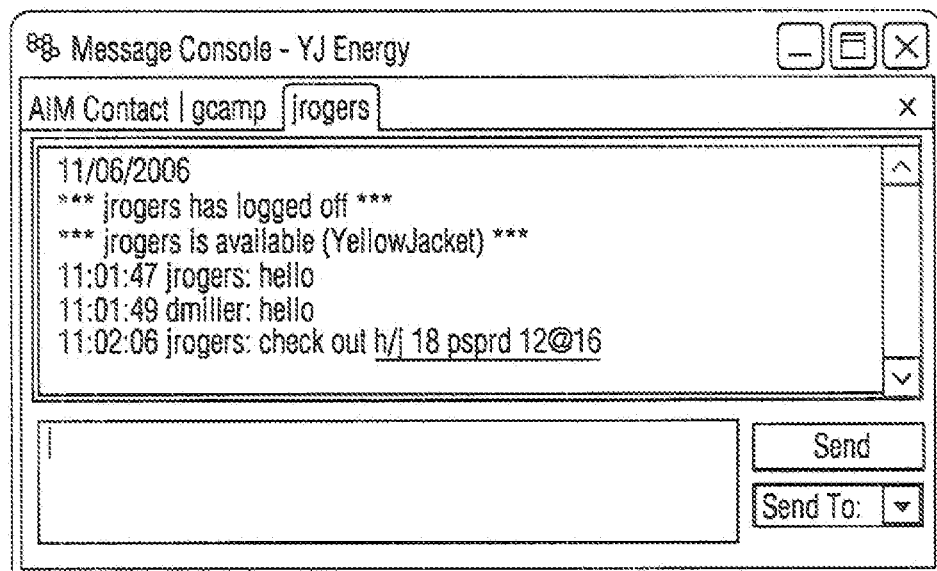

In FIGS. 4A and 4B, an example of a user's interactions are shown. In one embodiment, a user sends a message and a recognized quote is displayed. The quote is recognized and sent to the Market Data Bus of the sender. If the receiver is a user, then the market would also be sent to the Market Data Bus of the receiver.

According to the present invention, the market data bus includes components that act as market data providers and/or market data consumers. All market data that enters the bus may be consumed by other components. Among other providers and consumers, some market data providers and consumers include Market Data Recognition for parsing of unstructured text, incoming market data feed from the network of other users and publishers, quote console, pricing service integration, and several other plug-ins.

Figure 5:
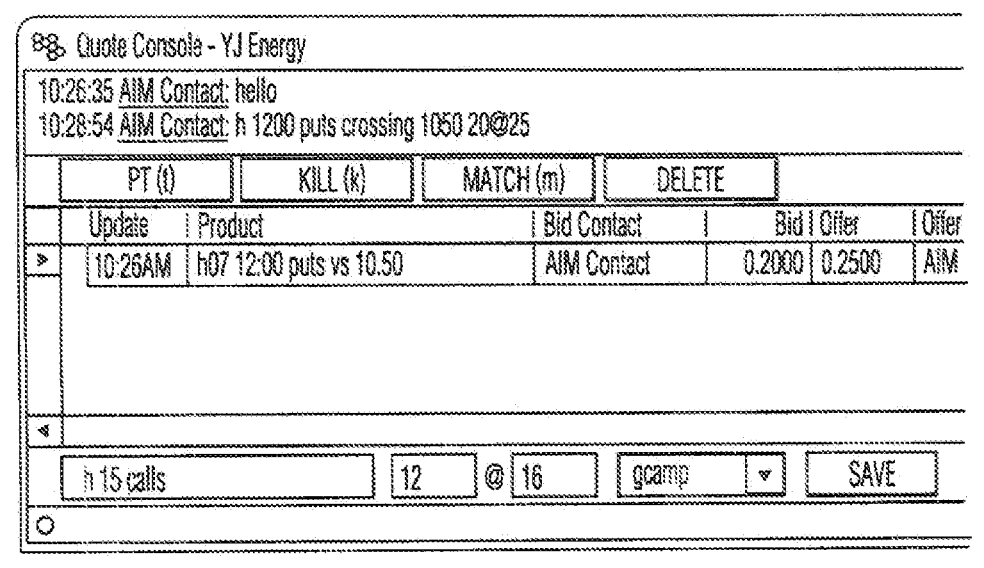

FIG. 5 illustrates an example of a quote being entered into a quote console. Among other things, a quote may be entered into a quote console. The quote console includes the ability to filter, to display structure components inline, to display quote depth inline, to enter firm or indicative quotes, and to generate instant messages from quote console activity. Other embodiments of the present invention may have a quote console with different features.

As described above, the MDR feature can convert unstructured text into normalized, structured quotes that are correlated with existing structure and quote data. Similar to how the MDR feature may convert unstructured text to structure and quote data, various user interface components of the present invention may convert the aforementioned structure and quote data back into unstructured (but normalized) text. This unstructured, normalized text may then be sent to the user's Market Data Bus for delivery to any number of recipients in any number of formats including instant messaging (IM) or electronic mail (email).

Figure 16:
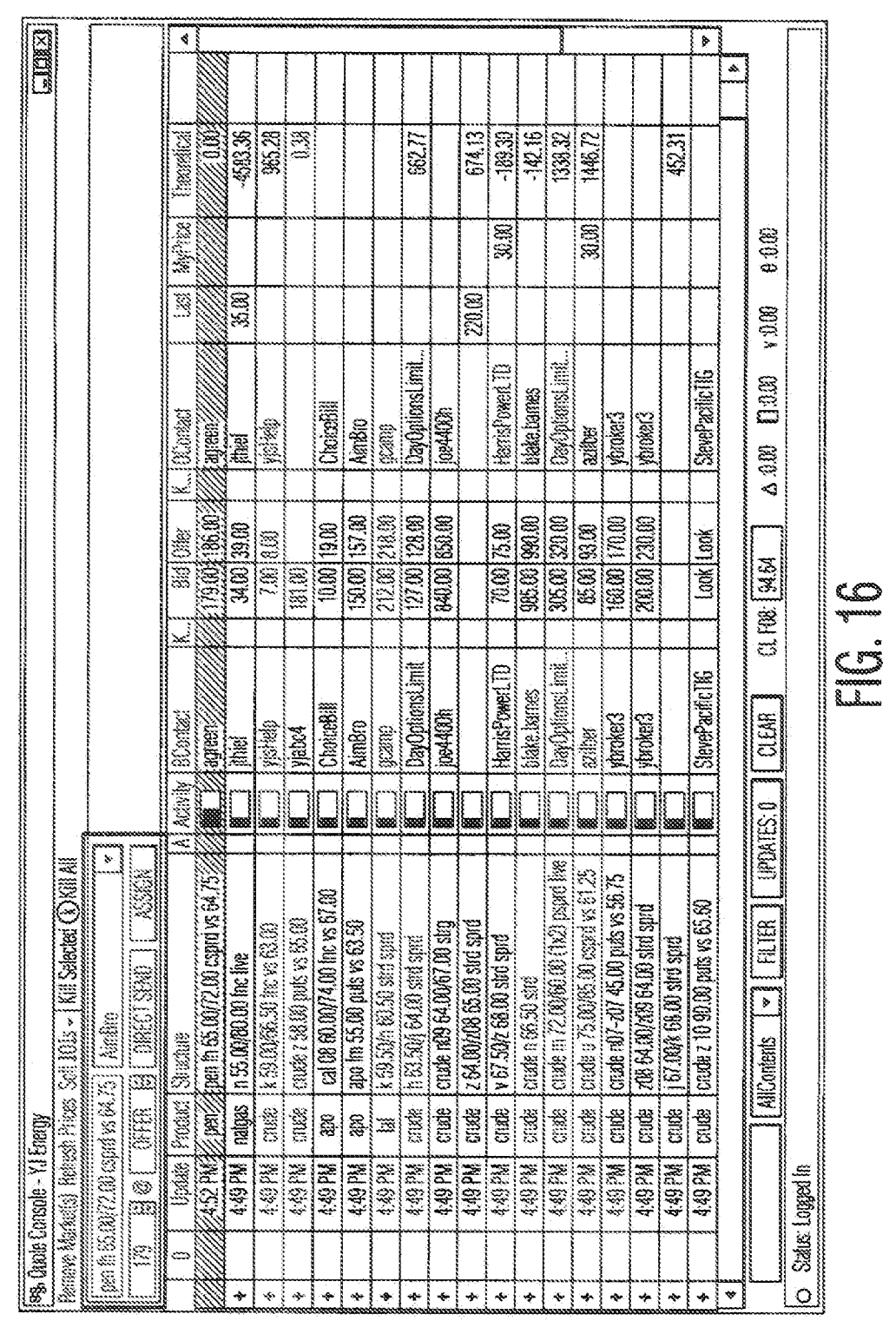
Figure 17:
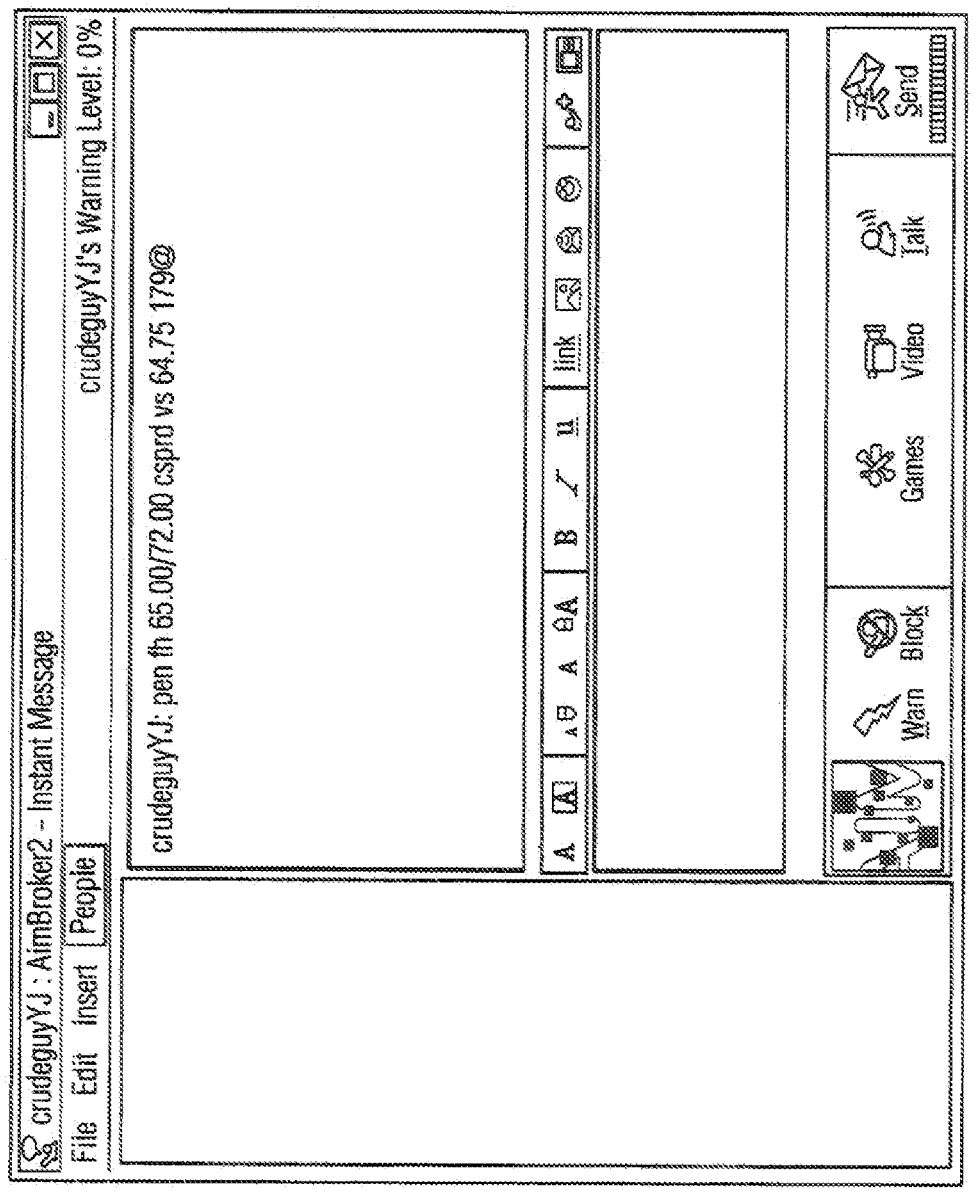
FIG. 17 illustrates a normalized message being sent to a non-user after pressing a "direct send" button in a Quote Console.
Figure 18:
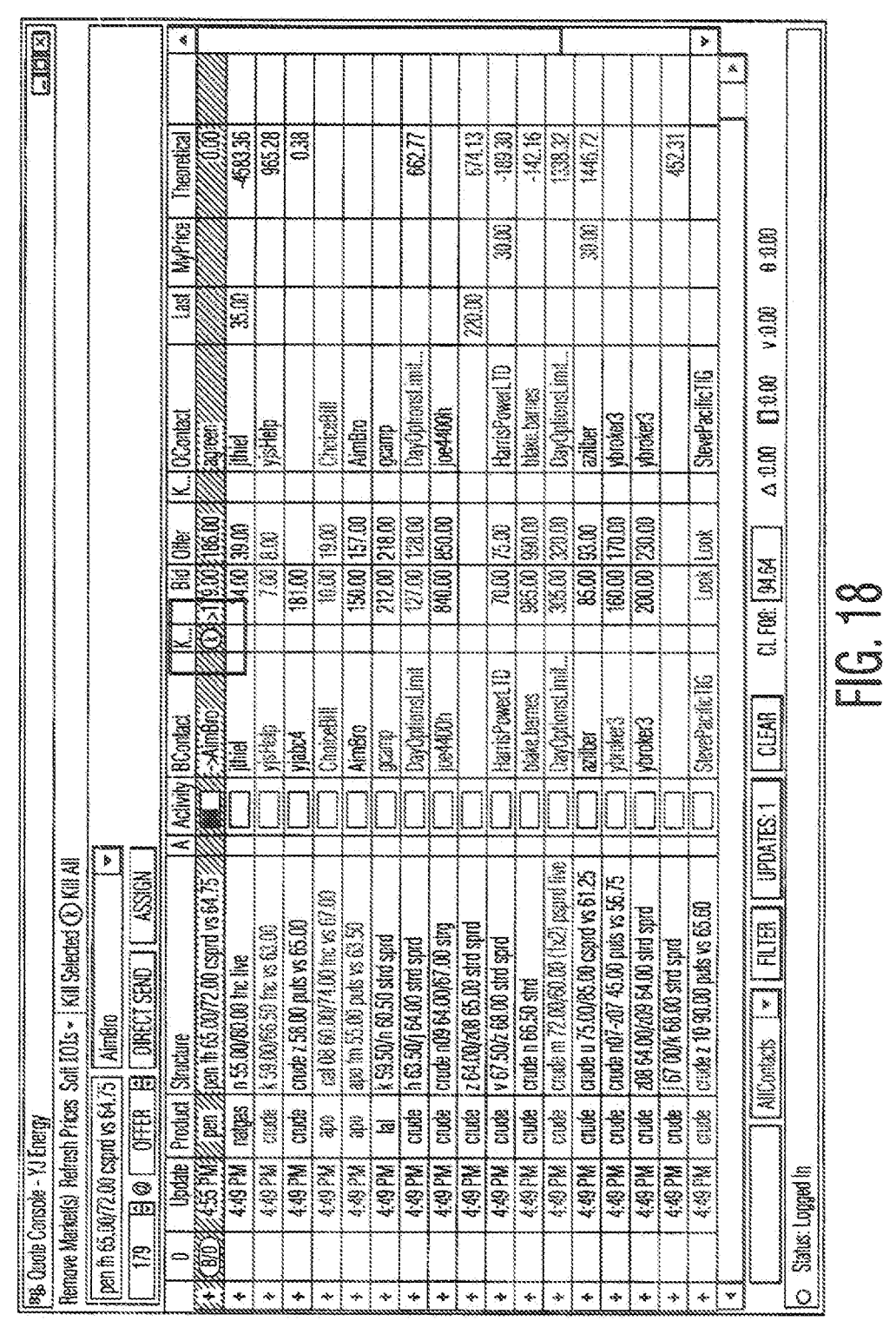
Figure 19:
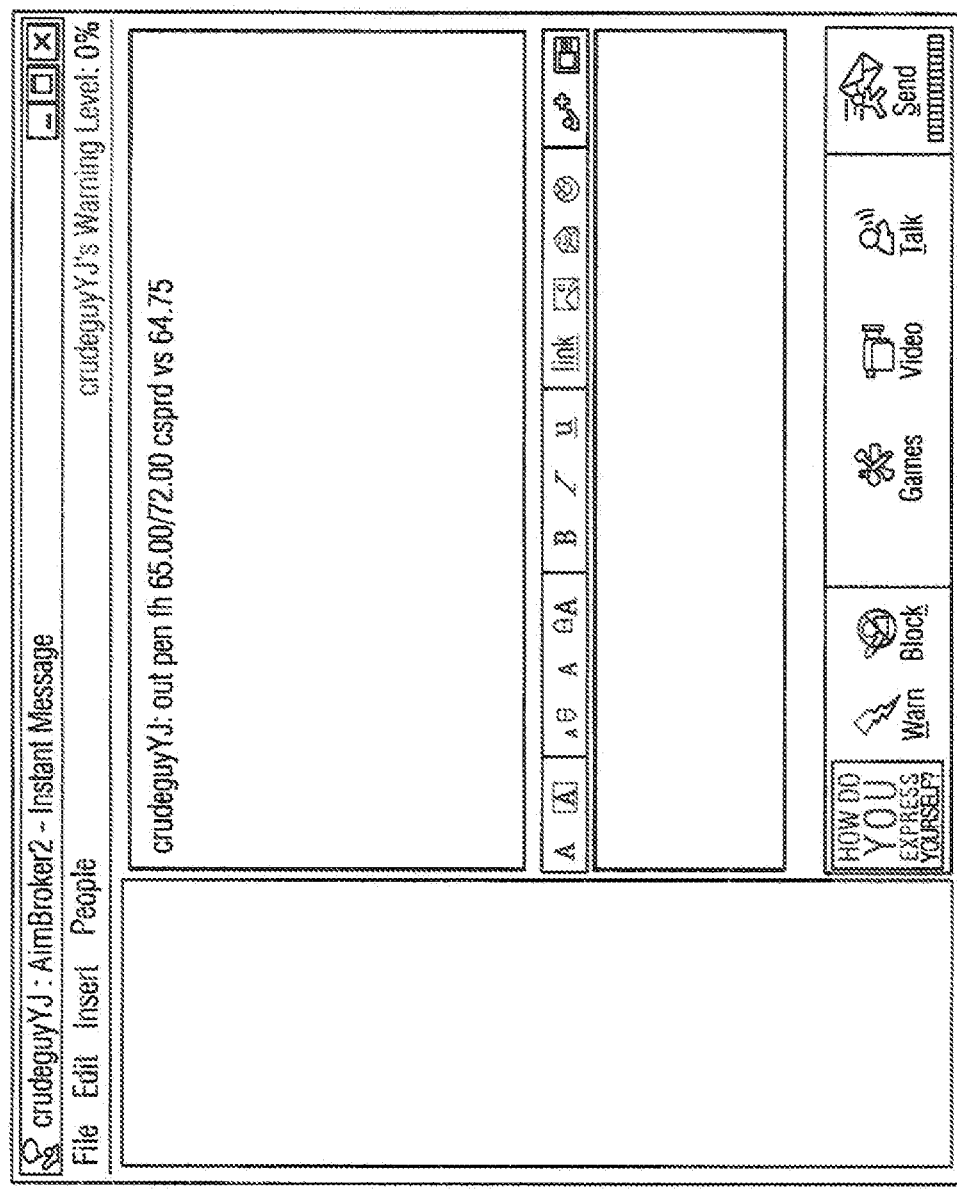
FIG. 19 illustrates an unstructured normalized message being sent to a non-user after pressing a "kill" button in a Quote Console, according to an exemplary embodiment.

One such user interface component is a Quote Console feature. The user may generate an unstructured, normalized text representation of any structure by clicking a line item in the Quote Console, entering a bid/offer (or both), selecting a recipient and pressing the "Direct Send" button. FIG. 16 and FIG. 17 show an example of an unstructured, normalized message being generated. This approach may increase the user's efficiency. For example, to remove a quote previously sent to a counterparty, a user may simply press the "K" button as detailed in FIG. 18 and FIG. 19. Pressing the "K" button, for example, will send a message to the user's Market Data Bus. The Market Data Bus will determine if the recipient is a user or a non-user. If the recipient is a user, then the message will be delivered to the recipient's Market Data Bus for processing. If the recipient is a non-user, then an unstructured, normalized text representation of the message will be generated and delivered to the recipient via any number of formats including IM or email—in this example pressing the "K" button has generated the IM "out pen fh 65.00/72.00 csprd vs 64.75" to non-user AIMBroker2.

Figure 8:
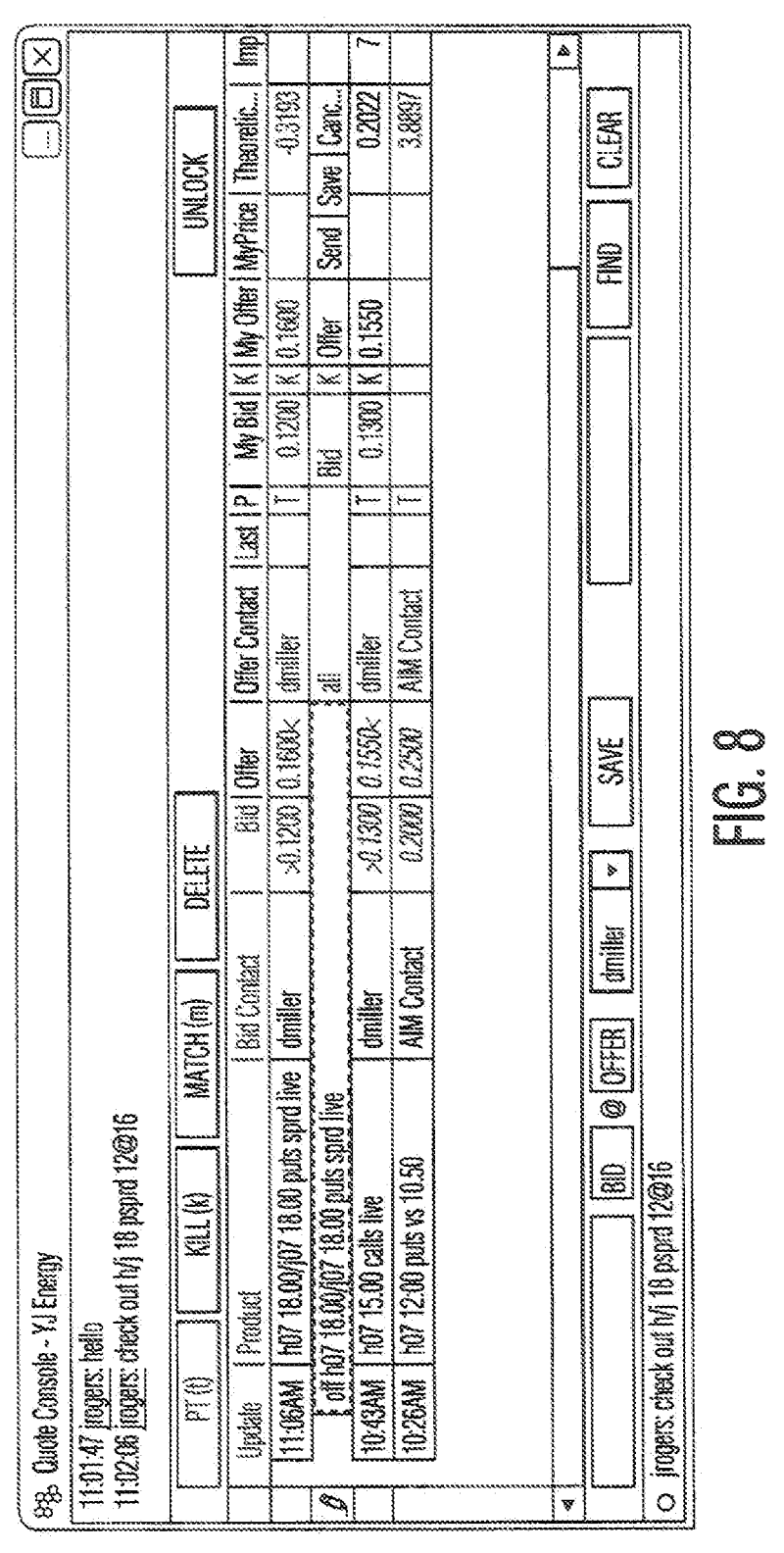
Figure 9:
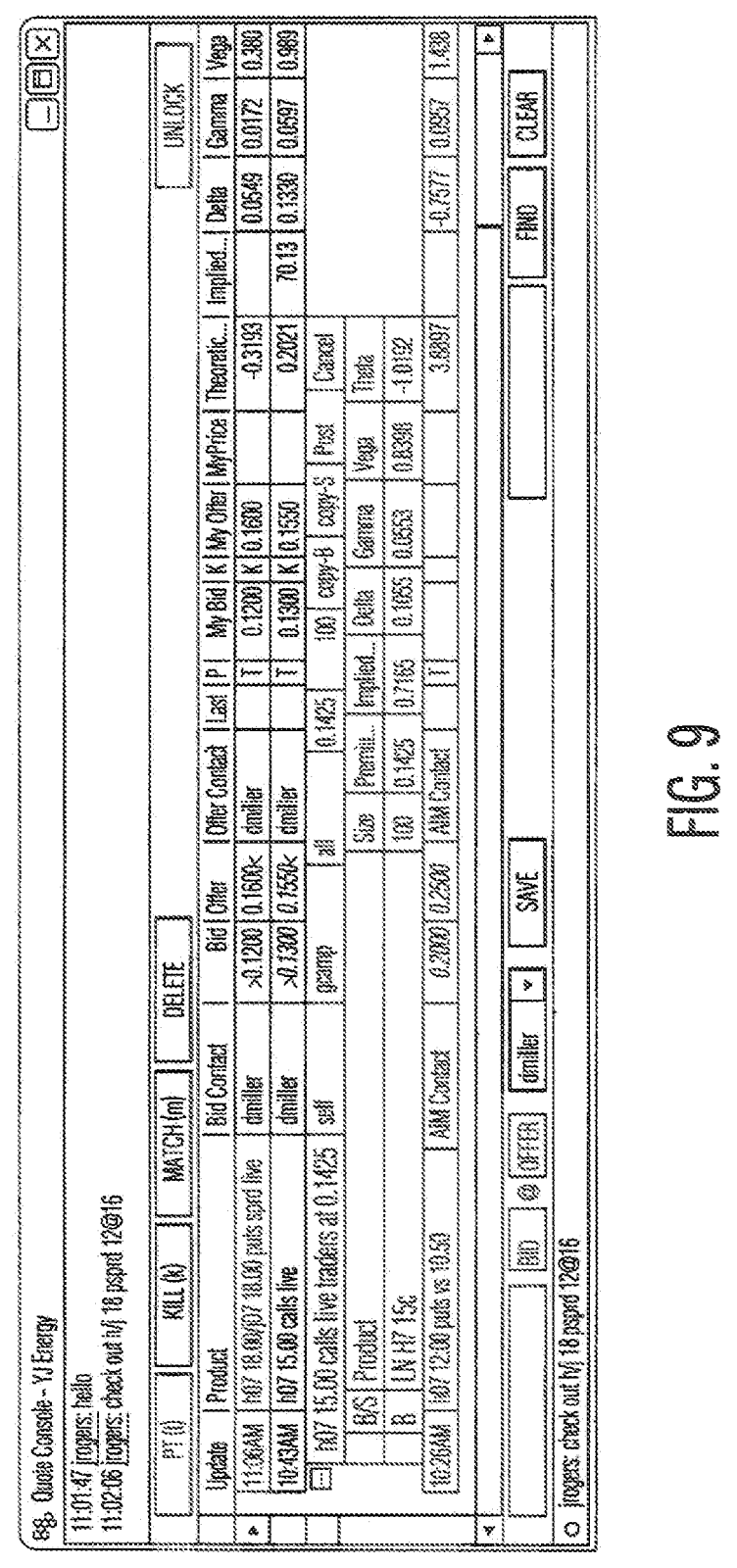

FIG. 6 illustrates an example of a quote bid and/or offer being edited in the quote console. FIG. 7 illustrates an example of a quote bid and/or offer being matched using the quote console. FIG. 8 illustrates an example of killing a bid and/or offer using the quote console, and FIG. 9 illustrates an example of generating a trade entry using the quote console.

The quote console includes quotes of various users with a built-in capability of editing the bids and offers. In addition, bids may be matched and killed in the quote console. Finally, trade entries may be placed in the quote console.

Figure 10:
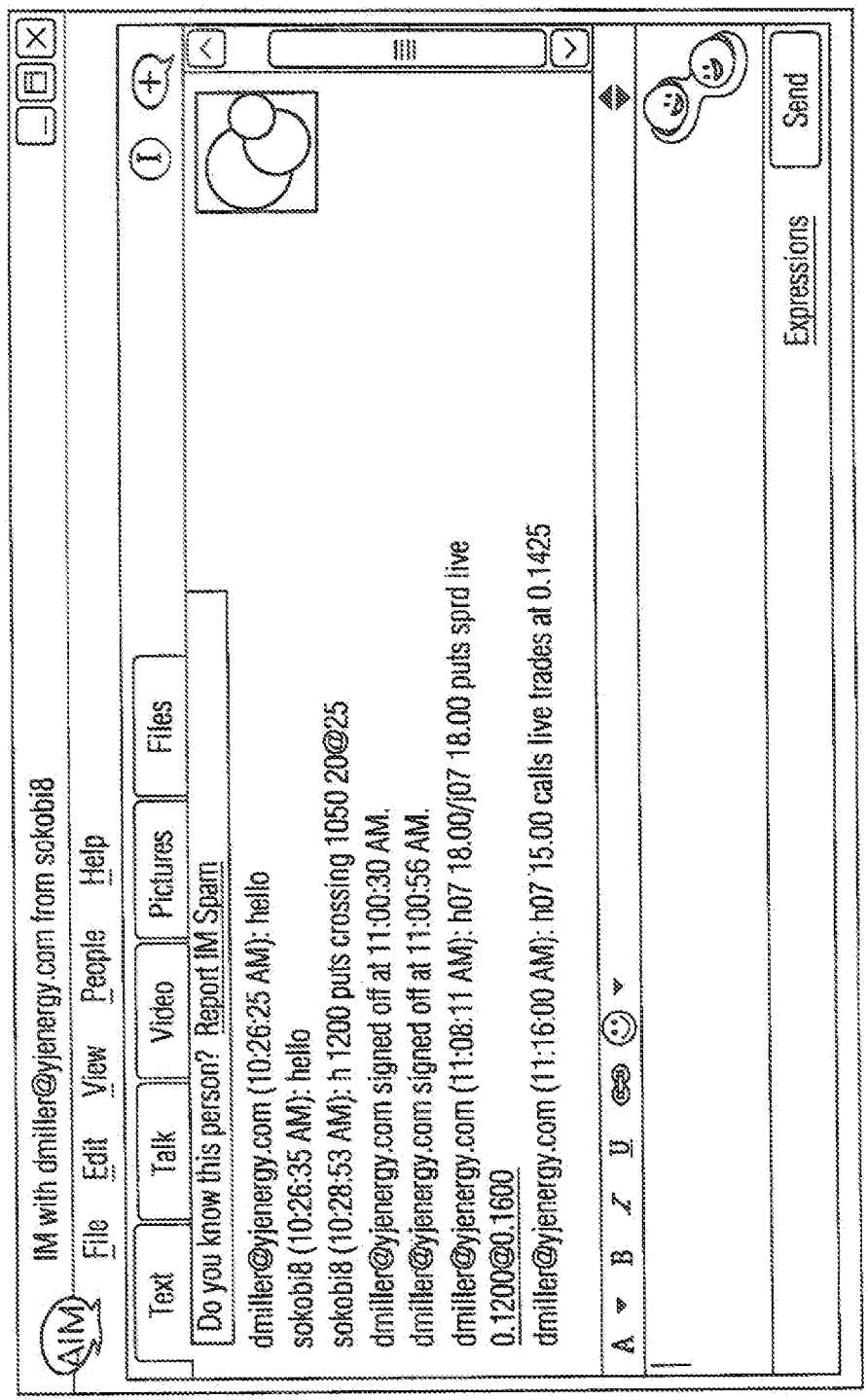
FIG. 10 is a screen shot of a non-user receiving a quote and trade entry data.

FIG. 10 shows an example of a non-user receiving a market update and a trade entry message generated via a quote console. This occurs because a user is communicating with a non-user. All parties involved in a communication do not have to be users.

Participants of OTC markets may share indications of interest (IOIs) with each other. The present invention provides technology that allows for efficient management of the accuracy and validity of all IOIs received by the user. A time is attached to each quote that is received by the user. As each quote ages it is pushed through an "expiration" lifecycle. The user may configure various levels of expiration, which have corresponding effects on the Quote Console and other user interface components. For example, in an embodiment of the present invention, the user may configure a Time-to-Italics (TTI). The TTI will mark older quotes in italic font in the Quote Console after a designated period of time and will also de-prioritize the quote with regards to other quotes. For example, assume a user receives an 18 bid at time 9:00 AM and a 17 bid at time 9:02 AM. Assume the user's TTI is set to 3 minutes. At time 9:01 AM the user's Quote Console will show the 18 bid as the best quote, however, at time 9:03 AM the user's Quote Console will show the 17 bid as the best quote (even though a bid of 18 is numerically better than a bid of 17) because the 18 bid has since reached its TTI.

The present invention also provides technology that allows for efficient management of the accuracy of all IOIs sent by the user. A time can be attached to each outgoing quote; as each outgoing quote ages it is pushed through an "expiration" lifecycle. The user may configure various levels of expiration, which have corresponding effects on the Quote Console, other user interface components, and outgoing messages. For example, in an embodiment of the present invention, the user may configure a Time-to-Live (TTL) for each quote. The TTL will automatically mark older quotes in italic font in the Quote Console and other user interface components. Finally, the TTL will also generate messages on-behalf-of the user to notify the original recipients of the price that the price is no longer accurate. For example, suppose UserA sends a price at 9:00 AM to UserB with a TTL of 4 minutes as follows: "x 12 calls live 30 bid". In this example, the product is November 12 calls and the quote is a bid of 30. At 9:04 AM the quote will reach its TTL and a message will automatically be sent to UserB on-behalf-of UserA as follows: "out 12 calls live"; the pre-pended "out" text indicates that UserA's 30 bid is no longer accurate.

Figure 11A:
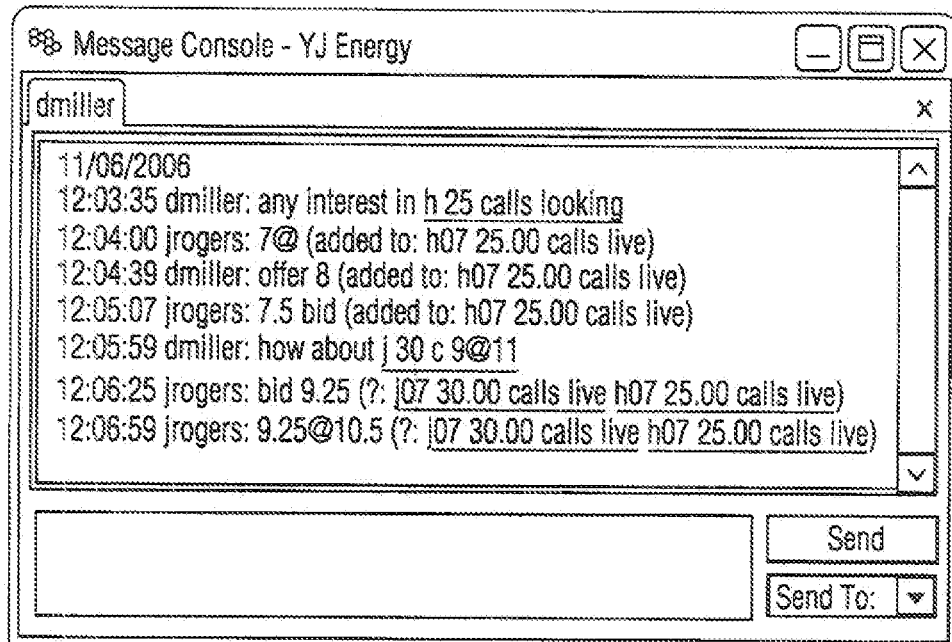
FIGS. 11A and 11B show a message console illustrating partial market data recognition.
Figure 11B:
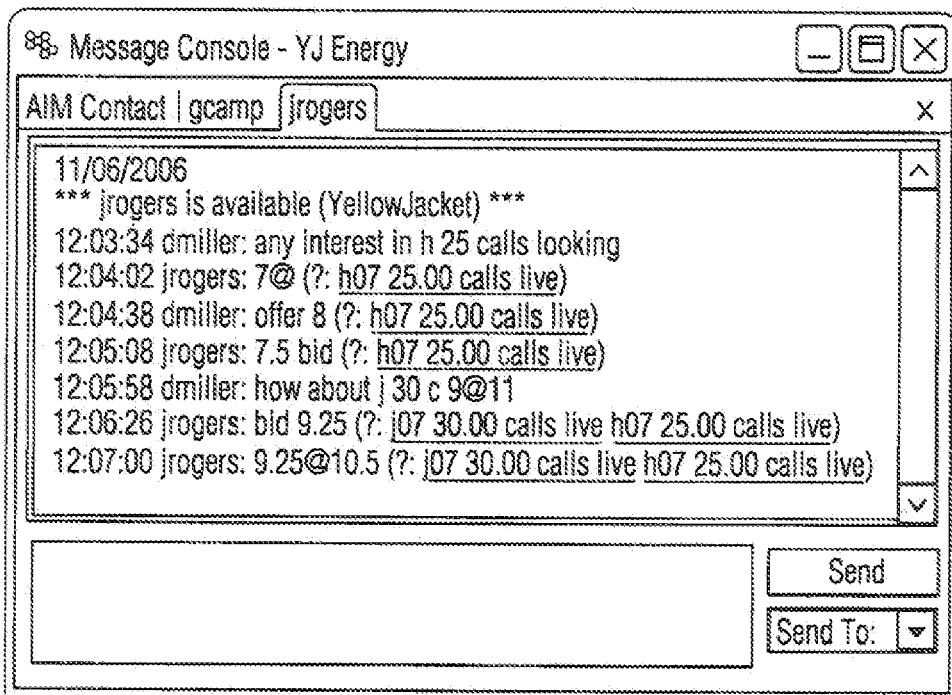

FIGS. 11A and 11B are examples of how the present invention recognizes and handles partial market data recognition. A partial quote consists of a bid and/or offer, but no associated structure. Here, in FIG. 11A, the messages are displayed as entered by the users. In FIG. 11B, a question mark is shown in places where the system may not know the association of the data. For example, the system may not know with which structure to associate the data. The system is able to recognize that this is relevant data, but just acts to ensure that a correct association is made rather than forming a baseless guess. This feature allows the methodology of the process to continue using the partial market data recognition. All actions do not come to a halt when portions of certain messages are not recognized by the MDR.

In one embodiment of the present invention, if product data is not recognized properly and/or is considered to be an invalid quote, it may be destroyed. However, even if destroyed, a copy of the original quote will always be preserved for later reference to determine whether or not the present invention acted correctly.

Essentially, partial market data recognition is designed to capture bid and offer information from text exchanges based on recent market context. For example, if a user sends or receives bid and/or offer information with no reference to which structure it pertains, the system will generate a list of markets associated with the counterparty based on recent market data history and based on user preferences, either automatically or with manual intervention, and will associate the bid and/or offer information with the appropriate market. This allows for rapid updating of bid and/or offer information either by the user or by counterparties.

Figure 12:
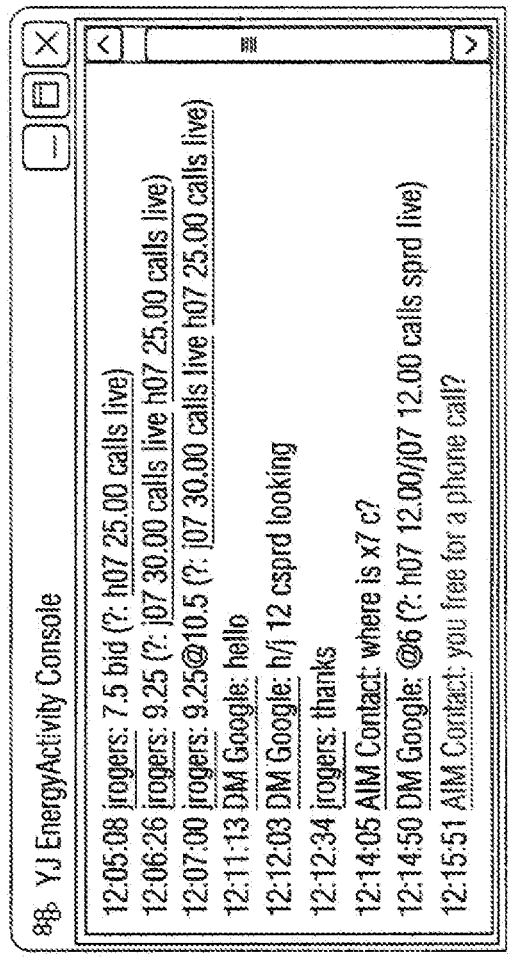
FIG. 12 illustrates an activity log in the activity console according to an exemplary embodiment.

FIG. 12 shows an example of the Activity Console according to an embodiment. The activity console is essentially an activity log, which provides a centralized, aggregate, real-time display of all incoming messages in chronological order. Messages in the Activity Console may be from users or non-users, from group or individual contacts, from an outside messaging server or an internal server, and may be part of a unicast or multicast message. The user has the option to reduce the aggregated messages to show only messages containing market data, or only messages containing trade data, or any other subgroup of the aggregated messages. The activity console can highlight when a message containing market data matches a custom user created alert.

In addition, a contact's communication window may be opened or activated from a link attached to the sender's name. This makes communication organized and time efficient. Also, the activity log may be filtered to display only markets, texts, trades, or other recognized markets in real-time. There are several different ways that the activity log may be filtered, including by users, by market data, by type of data being sent, by chronological order, by lineal order and so on.

FIG. 13 is an illustration and example of the pricing service feature. This feature may break down any structure to its component parts, a combination of futures, forwards, swaps, spreads, calls, puts, swaptions, or other products for pricing. Also, it may generate aggregate prices from legs. The Pricing Service Integration (PSI) typically is used to provide prices to other components. Another feature of the PSI is its ability to automatically price complex derivatives. Another feature of the PSI is the ability to allocate aggregate premiums to individual legs.

In one embodiment of the present invention, the PSI process begins with breaking down structures into component parts. All the derivatives, including fences, call spreads, straddles, etc. may be broken down into a combination of futures, forwards, swaps, spreads, calls, puts, swaptions or other products. The broken down structures are passed to a pricing service which is registered with the PSI component. The pricing service may price and re-price structures at any time and notify the PSI. The PSI passes pricing information into the market data bus. The pricing information may include one or more of the direct pricing support and the pricing support for the trade-entry, which is given a trade value. The direct pricing support provides an aggregate premium based on the user's pricing model. The pricing support for trade entry, which is given a trade value, includes premium allocation for each option based on several factors, some of which include a designated aggregate premium and sizes for swaps used to cross options. The user may plug-in a user defined pricing services.

The process for the breakdown is done to provide building blocks for mapping structure components for analyzing the exchange of contracts on derivatives. Pieces are analyzed to form a composite analysis. In addition, a different breakdown process may be implemented to accomplish mapping of the exchange components pieces to the relevant exchange products, for clearing, risk management, or other purposes.

In one embodiment, the process includes converting structures into a collection of clearable structure objects. This is a simple transformation to normalize various structure representations that typically involves wrapping a simple structure or each component in a basket structure with an implementation of the clearable structure interface that understands the structure or component. Another step in the process includes checking each clearable structure in the collection to make sure that it is clearable. Some structures are not possible to clear via the exchanges. Another step is to break down strips to individual months for each clearable structure in the collection, if it is cleared in that way. For each term, the clearable structure is converted into its component parts by the type of clearable structure.

Figure 15:
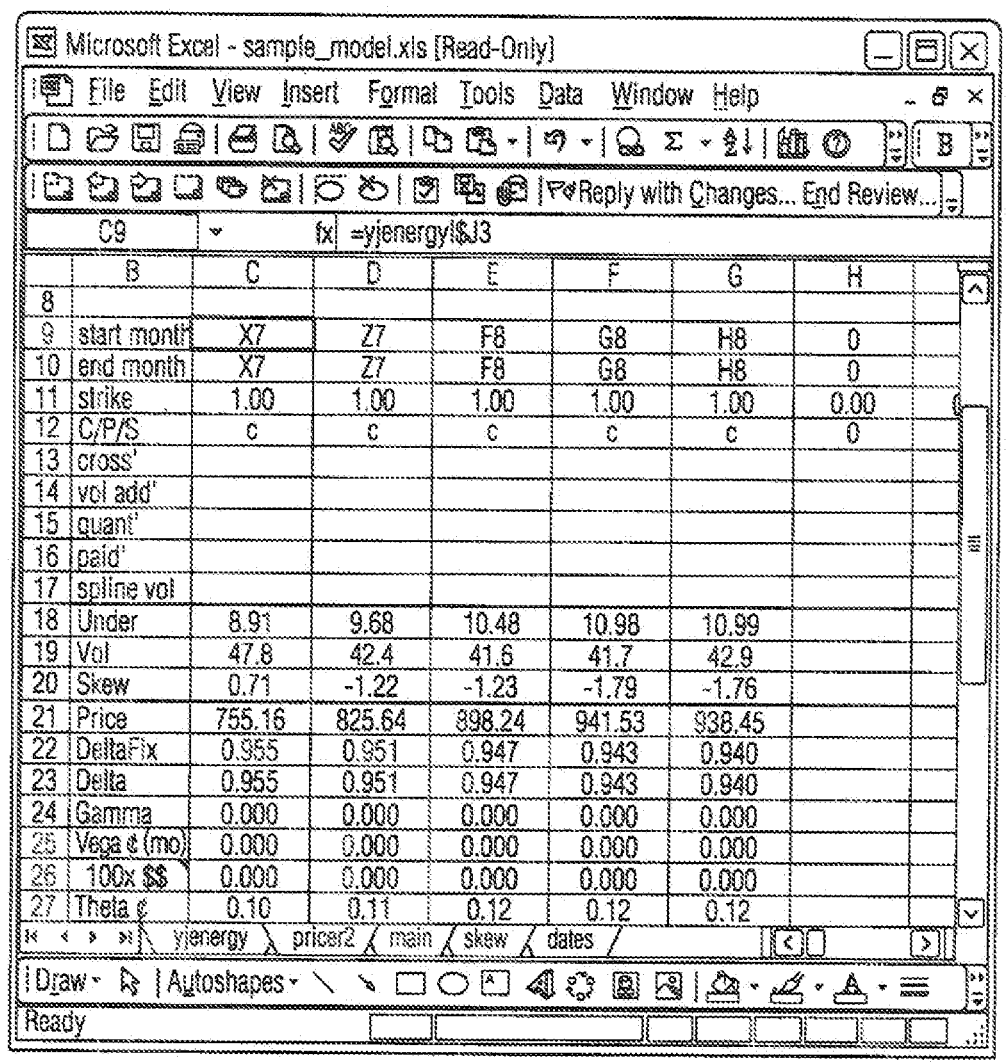
FIG. 15 illustrates a spreadsheet of the structure and quote data of FIG. 14 according to an exemplary embodiment.

FIG. 14 is an illustration of yet another feature that includes compiling and sending structure and quote data to a spreadsheet for easy access for the user. The spreadsheet in this example is an Excel.™. spreadsheet, but any functional program may work. Here, the structure and its component parts are sent to the spreadsheet where a potential pricing service is implemented, as shown in FIG. 15. FIG. 15 is an illustration of a spreadsheet showing the model prices for structure legs.

The present invention also allows for users of the system to view all market activity on a consolidated real-time screen. This enables users to analyze data and respond to any opportunities as quickly as possible. Control is gained over portfolio valuation and end of the day mark-to-market price verification functions. Trade negotiations are conducted and logged in a manner that satisfies information technology and compliance requirements.

The present invention also allows for the sharing of incoming or outgoing messages, or extracting and sharing the data contained within incoming or outgoing messages across multiple users of the application. Raw incoming and outgoing messages may be shared, or a single IM address could be assigned to an entire group, where all users of the system in that organization may share that IM address and view all messages coming in or out of it. The present invention may also hide the identity of the user sending the message, so that counterparties only see the group IM address.

Additionally, the data contained within messages may be extracted and shared across multiple users in an organization. The Quote Console may be configured as a shared view, allowing users to combine the various structures, quotes and trades they've been messaged separately into one comprehensive view. Additionally, the combined view may update in real-time, as individual users receive quotes. The data contained in the combined view may be exported into various formats and provided to other consumers of the data, or archived into other systems.

The present invention utilizes various platforms for information exchange. One example of an information exchange platform is instant messaging (IM). Large amounts of data may be sent to or from counterparties using IM. Different parties, for example, traders and brokers, may have multiple counterparties and multiple streams of messages conducted over IM. The present invention is an information exchange platform, like IM, and market data organization, processing, and publishing application. The application can send and receive, but is not limited to, unstructured messages on behalf of a user.

The application may also parse and extract structure and quote data from those incoming and outgoing messages, and may make the structure and quote data available on a quote screen, pricing services and other APIs. The present invention may also extract data and input relevant data into another platform and into another format, like a spreadsheet. In addition, the application is operative with users and non-users, alike. All participants in the system of the present invention need not be users or subscribers. Analytical information derived from product data may be placed on the market data bus by the PSI. Such data may also be plotted against settlement or historical data. For example, real-time calculated volatilities may be plotted on a volatility surface described by volatilities from previous settlement data.

Another feature of the present invention is its ability to grant privileges to certain users and their associated groups. If a user is a member of a specific group, where the group has a plurality of user members, and privilege is granted to the plurality of members of the group, then the members of the group will have the ability to view any messages or interactions that any of the other members are engaged in per permission granted. For example, User 1 and User 2 are corresponding using instant messaging over a network. If User 1 is a member of Group 1, where the group includes a plurality of members with the privilege to view the instant messaging of User 1, then all of the members of Group 1 will have the capability to view the instant messages sent and received by User 1.

The present invention includes several market data consumers. Some of which include output to unstructured text, market data feed, quote consoles, pricing service integration, and several other plug-ins.

Data from each of the virtual user databases may be de-personalized and aggregated to create an aggregate market data feed. Each virtual user database contains historical information about each quoted structure. This data may come from instant messages containing structure and quote data or from structured communication of structure and quote data. This market data includes all quotes and trades known by the user organized by structure. Aggregate data may then be gathered from the virtual user databases. Data may be correlated based on product type (nat gas, crude, etc.), structure type (swap, call, straddle, etc.), etc. In this way, various types of aggregate reports may be run. An example of an aggregate report is a raw data report that includes all tick and trade data without reference to the user with which it is associated. Another example of an aggregate report is a swap settlement report that includes prices for all swaps based on the history of ticks and trades for a given day.

Another example of an aggregate report is an option settlement report that includes prices for all options with activity for a given day based on the history of ticks and trades for that option (including strike). Further, another example of an aggregate report is an option settlement calculator that includes, for each underlying product type, a swap forward curve and a volatility surface based on the ticks and trades for a given day. Yet another example of an aggregate report is a historical chart showing activity over time for various swaps and options.

The present invention also includes the process of placing market data on a bus and processing and pulling off the market data off of a bus. In addition, the present invention teaches the process of pulling market data out of unstructured text. The unstructured text could be generated and/or displayed anywhere, for example from IM.

The method of the present invention of publishing to and consuming from the market data feed is designed and structured to work off of any platform. An example of a platform that the present invention may be used for is the OTC processes, i.e., users publish quotes to easily definable groups of counterparties, using a combination of unstructured text and the outgoing market data feed to reach counterparties both off and on the network of the present invention.

The market data recognition generally parses unstructured text. This process includes generally the processing of all incoming and outgoing text, between users and non-users. In addition, the market data recognition module includes a quote entry panel on the quote console.

The system of the present invention provides an interface for quoting new structures to counterparties and to others. The interface provides a way to send error free quotes in a normalized format. In an embodiment, in order to enter a new quote, a user will type into an input box in freeform text. As the user types into the freeform textbox, the system parses the user's text in real time and creates a financial structure or combination of financial structures that reflects the structure that the user has typed.

The present invention also has a broking component. The broking component is an agent that acts as a broker. Users of the system may send quotes to a broking agent. The broking agent may distribute quotes using a broker specific distribution workflow. An example of a distribution workflow is a broker that automatically broadcasts all quotes. Other examples of distribution workflows are workflows where the broker agent distributes only a subset of quotes to a subset of users based on roles or other criteria at particular times, and may at a later time or times distribute a different subset of quotes to a different subset of users based on various criteria. In this way the agent can replicate existing business processes.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A computer device comprising one or more processors, the computer device configured to execute computer executable instructions stored in a non-transitory memory, the computer executable instructions being configured, when executed by the one or more processors, to generate one or more graphical user interfaces comprising:
a messaging interface configured to:
display an unstructured plain text message received from a counterparty computer device in real time, the unstructured plain text message comprising a derivative contract description,
automatically highlight at least a portion of text in the unstructured plain text message corresponding to structure and quote data, the automatic highlighting based on matching one or more strings of characters in the unstructured plain text message with a list of expressions; and
a quote console interface configured to:
display the structure and quote data in a normalized standard format in real time,
receive, via data entry fields, input comprising one or more of entering, editing, matching, and cancelling the structure and quote data, and
receive, via the data entry fields, a selection instruction, which automatically triggers a set of operations that cause the one or more processors to automatically:
determine, based on information stored in a database corresponding to the counterparty computer device, a preferred data format of the counterparty computer device, the preferred data format being different from the standard data format, and
translate the structure and quote data and the input into the preferred data format;
the messaging interface further configured to:
generate a plain text message comprising the preferred data format, and
transmit the plain text message to the counterparty computer device using a communications protocol out of one or more communication protocols, the communications protocol chosen based on an availability of the counterparty device to receive the one or more communication protocols.

2. The computer device of claim 1, wherein the quote console interface further comprises:
a quote send button for sending a bid and/or offer to a counterparty device of the one or more counterparty devices upon selection of at least one product, entering of the bid and/or offer, selection of the contact, and selection of the quote send button.

3. The computer device of claim 2, wherein the bid and/or offer is sent in a text message to the counterparty device of the one or more counterparty devices.

4. The computer device of claim 1, wherein the quote console interface further comprises:
a delete button for removing a previously-sent quote to a counterparty device of the one or more counterparty devices upon selection of the quote and selection of the delete button, wherein a text message is sent to the counter-party.

5. The computer device of claim 1, wherein the quote console interface further comprises:
a filter screen having a list of selectable filter options, wherein selection of one or more filter options causes the quotes that meet the selected options to be displayed and/or indicated.

6. The computer device of claim 1, wherein the quote console interface further comprises:
data entry fields for generating one or more quotes, wherein a new structure is generated in text upon entering of quote information in the data entry fields and distributed to one or more counterparties.

7. The computer device of claim 1, wherein the computer-readable instructions, when executed, further cause the one or more processors to:
identify the at least portion of text in the unstructured plain text message;
derive the structure and quote data pertaining to one or more structures from the at least the portion of text; and
re-arrange the structure and quote data pertaining to one or more structures into the normalized standard format.

* * * * *